3,343,922
CHEMICAL REACTOR
Hans Joachim Zimmer, Kronberg, Taunus, and Walter Dietrich, Offenbach (Main), Germany, assignors, by mesne assignments, to Vickers-Zimmer Aktiengesellschaft, Planung und Bau Von Industrieanlagen, Frankfurt am Main, Germany, a corporation of Germany
Filed Sept. 23, 1963, Ser. No. 310,705
14 Claims. (Cl. 23—285)

This invention relates to apparatus for the carrying out of slowly progressing chemical reactions in the liquid phase, especially poly-condensations as in the production of polyesters.

Polyesters are plastics materials which are produced by the poly-condensation of multi-basic carboxylic acids with multi-valent alcohols. One of the most important plastics materials of this group is polyethylene terephthalate which is produced by the poly-condensation of diglycol terephthalate. The poly-condensation of diglycol terephthalate is carried out by heating in a high vacuum in order to cause a certain maximum degree of condensation. Immediately after attainment of this maximum degree of condensation, the polyester obtained must without delay be worked up, for example, by spinning, into a desired product since otherwise an undesirable deterioration in the degree of poly-condensation sets in.

The poly-condensation is carried out in reactors which must satisfy certain special requirements. Thus, for example, a relatively large evaporating surface is necessary and, furthermore, it must be possible to conduct away the condensate, for example, water.

An object of the present invention is to provide an improved cendensation reactor.

A further object of the present invention is to provide a condensation reactor wherein the poly-condensation process may be made continuous.

Another object of the present invention is to provide a condensation reactor having improved rotatable worms.

A feature of the present invention is the provision in a condensation reactor of a plurality of axially displaceable worms rotatably mounted in a container which fits closely to the peripheral edges of the worm-lands. The flanks of the worm-lands are curbed transversely on a radius having a length corresponding to the distance between the axes of the worms, the flanks of which interengage with axial play.

According to another feature of the invention, the rotating worms, preferably three or more, within the reaction container are so arranged in a horizontal plane that the outer peripheral edges of the one worm always slide along the flanks of the adjacent worm and thereby clean the same. In this way there continually occurs a mutual stripping off of reaction liquid from the flanks of the worms. Without such a self-cleaning, continuous polycondensation by means of worms arranged within a reaction container could not be carried out.

Advantageously, the reaction container of the present invention is arranged within a closed, preferably cylindrical heating container which consists of several longitudinally spaced chambers and is supplied with a suitable heating medium.

Further objects and advantages of the present invention will become clear from the following more detailed description of some embodiments thereof taken with reference to the accompanying drawings, wherein.

Figure 1:
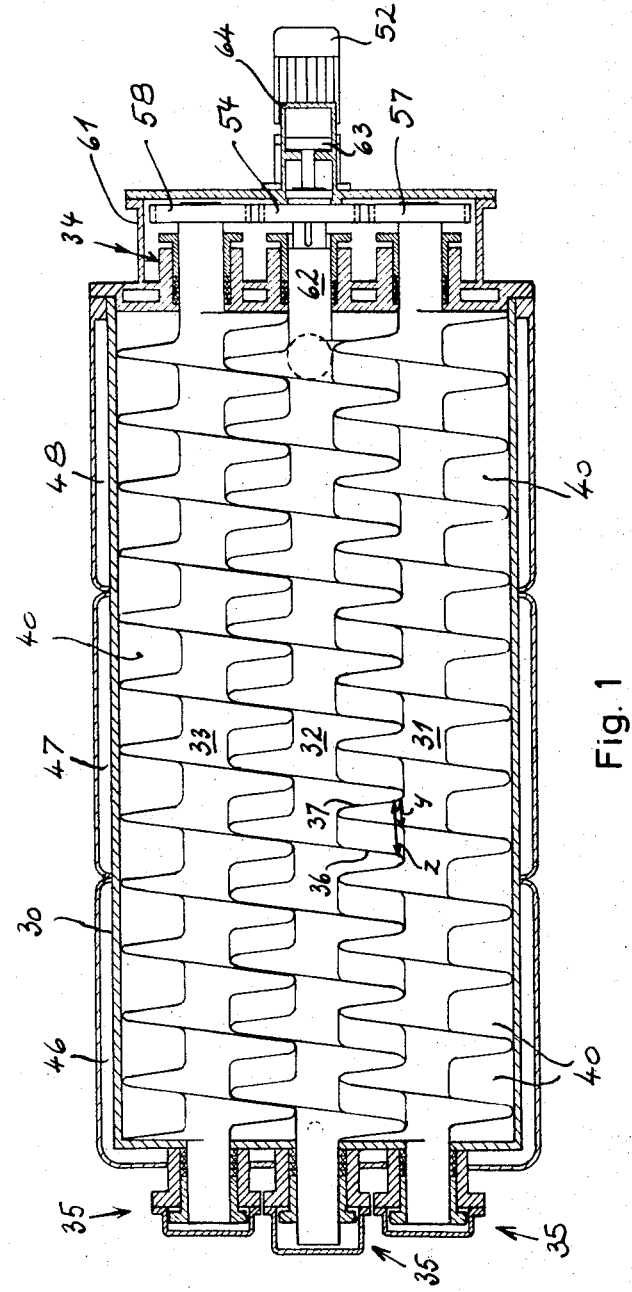
FIGURE 1 is a horizontal section of one example of a poly-condensation reactor embodying the invention.
Figure 2:
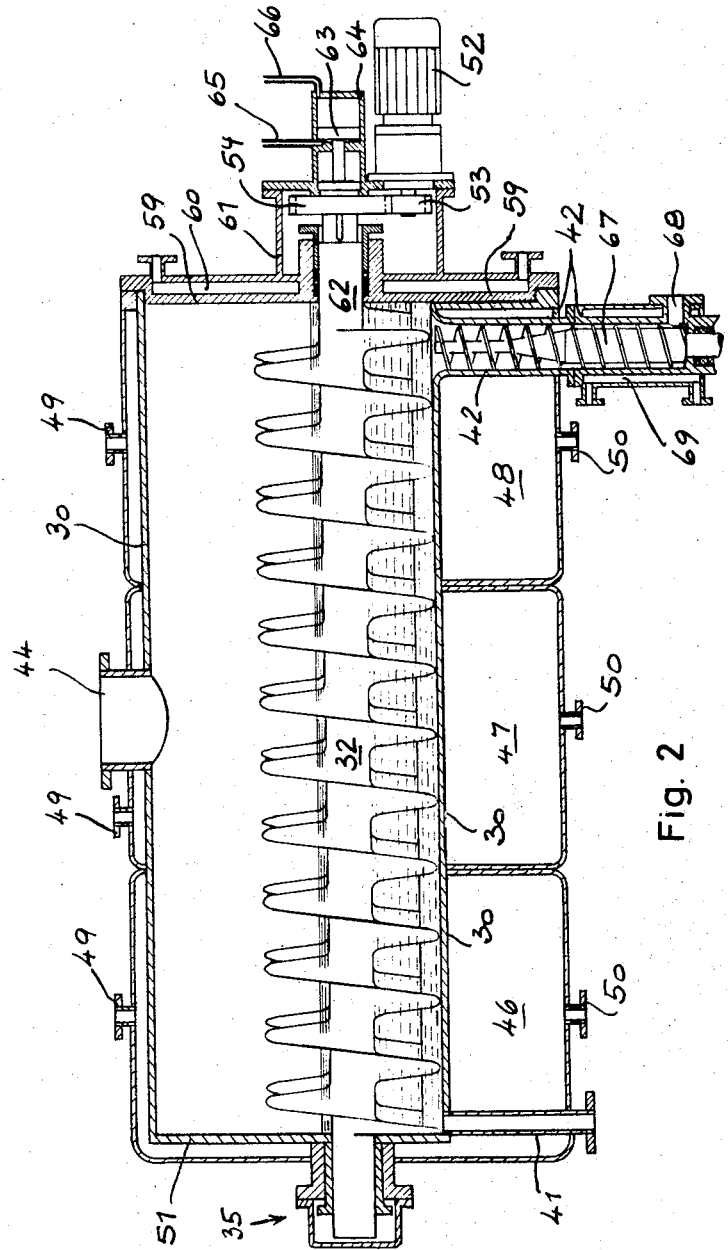
FIGURE 2 is a longitudinal vertical section of the reactor of the present invention.
Figure 3:
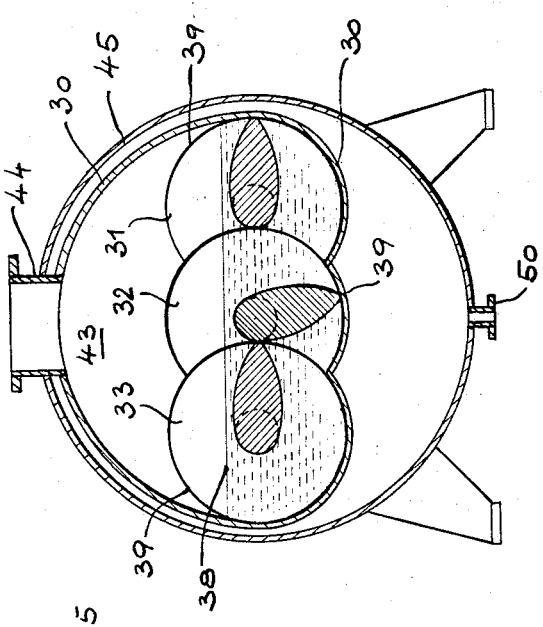
FIGURE 3 is a central transverse section of the reactor of the present invention.
Figure 4:
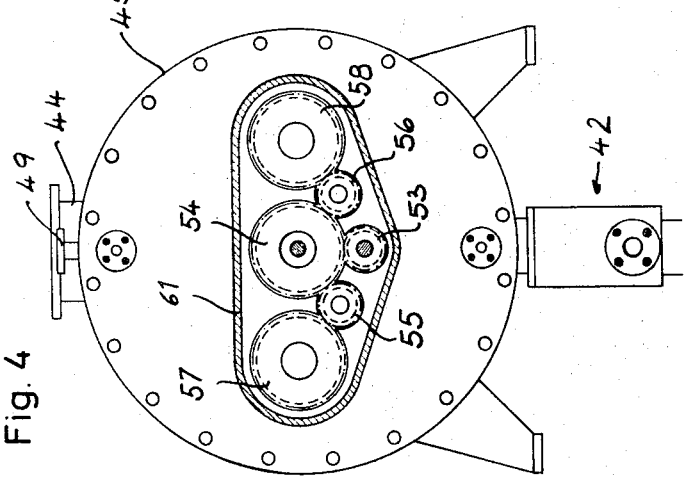
FIGURE 4 is an end view of the reactor of the present invention taken from the right of FIGURE 2, with some parts removed.

Prominent among the problems dealt with and solved by the present invention is that of the carrying out of slowly progressing chemical reactions with liquid reactants, especially the carrying out of continuously progressing poly-condensation processes in the production of macro-molecular synthetic materials.

The general principle of the solution according to this invention resides in the use in such condensation reactors of worms of a particular construction and in a particular arrangement with respect to one another and with respect to the interior of the container defining the condensation reactor.

In the example shown in FIGURES 1 to 4, three worms 31, 32, 33 are rotatably arranged within a reaction container 30 with their axes parallel. The worms are guided at their ends in suitable sealed radial bearings 34 and 35, the sealing being effected in the usual manner by stuffing boxes or similar means. This sealing of the shaft guides or bearings is important because a comparatively high degree of vacuum must be maintained within the container 30 during the reaction.

The worms 31, 32, 33 fulfill a double purpose during the carrying out of the reaction, namely, on the one hand, they offer the necessary large condensation surfaces and on the other hand, due to the rotary drive, they effect a continuous carrying out of the reaction. The starting material is continuously introduced into the container 30 and the end product is continuously removed therefrom.

The condensation surfaces are formed at the worms by their flanks which, due to the rotation of the worms, upon their emergence from the liquid always carry with them a film of the liquid which then condenses in the reaction space disposed above the surface of the main body of the liquid. It cannot be avoided, in consequence of the condensation, that a portion of the reaction product is deposited on the flanks of the worms. The building up of such deposits must in every case be prevented.

According to the invention, therefore, worms are employed which effect a mutual self-cleaning of their flanks. The basic construction of such self-cleaning worms requires that the flanks be arcuately formed in transverse section, the radius of curvature of the curved flanks corresponding to the distance between the axes of the two interengaging worms. In practice, any worm shape constructed according to this principle may be employed in a reactor according to the invention. FIGURES 5 to 11 show various constructions of such worms in greater detail.

In the basic or starting shape of such self-cleaning worms (see FIGURES 5 and 6) the adjacent worms tightly interengage one another without axial play. Thus, dependent upon the direction of rotation, the desired liquid film can form only on the flanks of the one outer worm since for the remaining inner worms and the other outer worm the liquid will be immediately stripped off again. For the carrying out of the chemical reactions explained above, however, the formation of a liquid film on all the worms is necessary.

According to a feature of the invention, therefore, the individual worms 31, 32, 33 have a certain degree of axial play in relation to each other. The distance $z$ between flanks of one worm 32, for example, succeeding each other in the axial direction, e.g. the flanks 36, 37 in FIGURE 1 (the thread groove), is greater than the axial thickness $y$ of the embraced land of the adjacent worm 31. By relatively displacing the worms in the axial direction, it can be ensured that the flanks of one worm, e.g. 31, come to bear alternately upon the flanks 36 or 37 of the adjacent worm 32 and thereby exert the stripping action alternately on the one and the other flank. That flank of the thread or land which is not in contact with the opposed flank of the adjacent worm (in the position shown it is the flank 37) entrains with it a film of liquid as also does the opposed flank of the adjacent worm.

The intermittent cleaning and freeing of the worm flanks, in the case of the reactor with three juxtaposed worms shown in the drawing, may be simply effected by mounting only the central worm for axial displacement.

Dependent upon the reactions to be carried out and upon the action of the starting material, the central worm is axially displaced from time to time during the course of the reaction from the one end position (for example, abutment against the flanks 36) to the other end position (abutment against the flanks 37). In this way, the formation of a liquid film on all worms is ensured and the building up of deposits of the reaction product on the flanks is prevented.

The worms produce a continuous advance of the liquid through the container 30 at a rate proportional to the speed of rotation of the worms. It is naturally very undesirable that this should lead to mixing of the reacting liquid in the axial direction of the container. In order to prevent such mixing, therefore, the wall of the container 30 fits closely to the outer edges 39 of the worms at least in the zone of the body of liquid, i.e. up to the height of the upper surface 38 of the liquid. Completely closed chambers 40 are thereby formed between each two successive turns of a worm. These chambers extend over the whole width of the container and are slowly displaced, with their contents, by the rotation of the worms, from the inlet connection 41 towards the outlet connection 42, the reaction continuously proceeding during this continuous longitudinal motion. A mixing in the longitudinal direction will only be avoided, however, if the level 38 of the liquid does not rise above the upper edges of the worms and also if the wall of the container 30 fits closely to the outer edges of the worms at least up to the height of the liquid level (see particularly FIGURE 3).

A comparatively high vacuum is necessary in the reaction container 30 for the carrying out of poly-condensations. This vacuum is established in the enlarged space 43 remaining above the surface 38 of the liquid, this space preferably being of semi-cylindrical shape. Condensate, for example, water, is continuously removed through a connection 44 provided in the upper part of the container 30 and the necessary vacuum is thereby at the same time produced.

Furthermore, heat must be supplied during the reaction. For this purpose the whole reaction container 30 is surrounded by a heating jacket 45, of cylindrical shape in the example illustrated. In order that the heating temperature may be stepped in the longitudinal direction of the container, according to the reaction being carried out, the heating jacket 45 may comprise several, for example, three, separated heating chambers 46, 47, 48. Each heating chamber is provided with an inlet connection 49 and an outlet connection 50 for the heating medium. The endmost heating chamber extends also over the end wall 51 of the reaction container.

The rotary drive of the worms is effected in the example illustrated by means of an electric motor 52, which is disposed externally of both the reaction container and the heating jacket. The drive from the motor shaft is transmitted by way of gear wheel 53 (FIGURE 4) to a gear wheel 54 arranged on the central worm 32 externally of the reaction container and is then transmitted through the intermediary of further gear wheels 55 and 56 to the gear wheels 57 and 58 arranged on the worms 31 and 33. The gears 55 and 56 reverse the direction of rotation so that all the worms will be driven in the same direction. Suitably, as shown, that end wall 59 of the reaction container which is adjacent to the gearing described is provided with a cooling chamber 60 which prevents an undesired transmission of heat to the gearing. The latter is arranged in a housing 61 connected to the end wall of the container.

According to the invention, the central worm 32 is to be displaced to-and-fro from time to time in the axial direction. This additional movement is produced by means of a hydraulically or pneumatically actuated piston 63 arranged on the end of the worm shaft 62 and displaceably guided in a cylinder 64. The cylinder is provided with the usual pressure-fluid connections 65, 66. The end of the worm shaft 62 is displaceable axially in but forced to rotate with the gear wheel 54 which is itself held against axial displacement.

The supply of the reaction liquid is effected, as already stated, by way of the connection 41. As a vacuum constantly obtains within the container 30, no special feeding means is necessary for the introduction of the liquid. On the other hand, the removal of the reaction product at the other end of the container by way of the connection 42 is effected against the loading produced by the vacuum. For this reason, a conveyor screw 67 is provided within the connection 42 for feeding the reaction product directly by way of a conduit 68 to a working-up device, for example, a spinning device, so as to avoid deterioration of the degree of condensation after the reaction product leaves the reaction container. The connection 42 is provided with a further heating jacket 69 so that the temperature may be maintained beyond the zone influenced by the heating jacket 48.

FIGURES 5 to 11 are concerned with the formation of the worms which may be used in the reactor of the reactor of the present invention. All these worms exhibit a cross-sectional shape which is in accordance with the principle already stated, that is, in which the radius of curvature of the arcuate surfaces of the flanks agrees with the spacing of the axes of the adjacently disposed worms.

Figure 10:
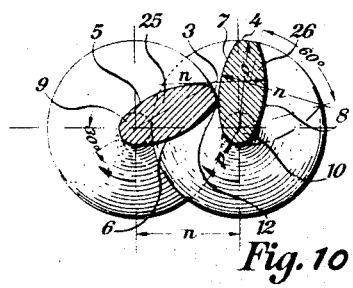
FIGURES 10 and 11 are transverse cross-sectional views of yet another worm for use in the reactor of the present invention.
Figure 11:
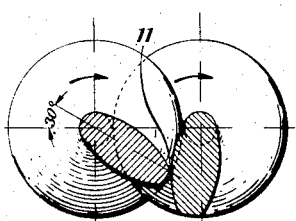

Worms constructed in this manner may, however, be so formed, in accordance with a further feature of the invention, that they tightly interengage and do not permit an axial displacement such as is desired in the case of the worms in the reactor. In such cases, worms having the mutual cleaning action may find application in other devices as, for example, conveying and mixing worms. The examples illustrated in FIGURES 5 to 9 are concerned with such tightly interengaging worms, whereas FIGURES 10 and 11 show worms having spaced axes such as find application, for example, in the reactor according to the invention. All the worms shapes and combinations of FIGURES 5 to 9 may, however, also find application as worms with spaced axes, that is, as worms for a condensation reactor, after corresponding alteration of the cross-section.

Figure 6:
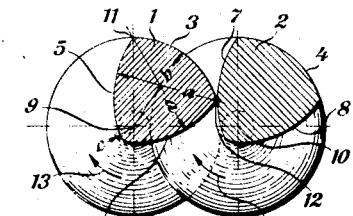
FIGURE 6 is a transverse cross-sectional view of the worm taken along the line 6—6 of FIGURE 5.

As is shown in FIGURE 6, the land of each of the worms 1 and 2, as seen in cross-section, is bounded by four arcs, one of which is the arc of the outer surface 3 or 4 of the worm, the radius $b$ of which corresponds to the radius of the whole worm body, and others of which are the two arcs of the worm flanks 5 and 6 or 7 and 8, the radii $a$ of which correspond to the distance $a$ between the axes 9 and 10 of the two worms. The distance $a$ corresponds also to the chordal length of the arc of the outer surfaces 3 or 4 of the worms. The central points of the arcs of the flanks, for example, 5 and 6, lie at the contacting edges 11 and 12 of the flanks 5 and 6 formed where these latter meet the outer surface 3. A further inwardly disposed arc is formed by the worm core 9 or 10, that is, the radius $c$ of this fourth arc corresponds to the core radius of the worm.

As can be seen from FIGURE 6, upon a rotation of the two worms in the same direction, one land edge (as shown, the edge 12) slides along that flank (as shown, the flank 7) of the adjacent worm which is opposed thereto and thereby cleans this portion of that worm. For the direction of rotation of the worms indicated by the arrows 13, the land edge 12 slides from the position shown along the arcuate face of the flank 7 up to the inner end thereof. Then the worm core 10 slides along the outer surface 3 until the land edge 11 strikes the other flank 8 of the worm 2, whereupon this edge slides along that flank and cleans the same. Upon further rotation of the two worms this process repeats, that is, the flanks 5 and 6 are cleaned by the land edges of the other worm and the outer surface 4 is cleaned by the worm core 9.

The lines of contact between the edges 11 or 12 and the flanks 7 or 8 upon which they bear at any time extend (in the plan view of FIGURE 5) alternately below and above the plane of the paper.

Figure 7:
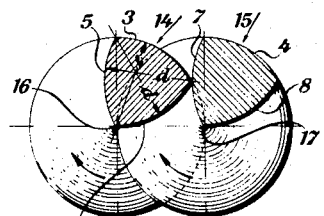
FIGURE 7 is a transverse cross-sectional view of a modified worm for use in the reactor of the present invention.
Figure 5:
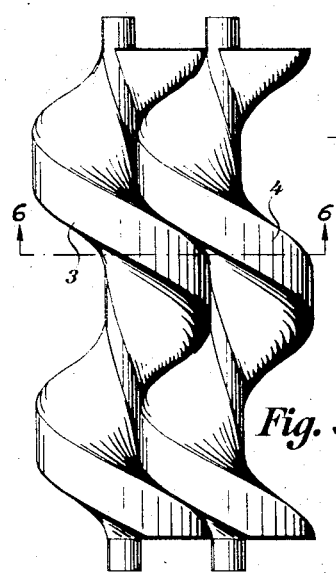
FIGURE 5 is a plan view of a worm for use in the reactor of the present invention.

FIGURE 7 shows two worms 14, 15 of equal size embodying the feature of the present invention but in which, in contradistinction to the form shown in FIGURES 5 and 6, the radius $c$ of the core has diminished to zero, that is to say, this worm is coreless. Hence the lands of the worms are now bounded by only three arcuate surfaces, namely, the outer surfaces 3 or 4 and the flanks 5 and 6 or 7 and 8. Due to the absence of worm cores, the two interengaging worms 14, 15 are placed closer together so that the peripheral line of the one worm passes through the axis of the other worm. The flanks 5 and 6, or 7 and 8, meet directly at the center of the worm so that an edge 16, or 17, is formed instead of a worm core.

The mutual cleaning operation effected upon rotation of the worms corresponds to that described in relation to FIGURES 5 and 6. Instead of the surface of core radius $c$, there slides along the outer surface 3, or 4, of the neighboring worm, in this construction, the edge 16, or 17.

Figure 8:
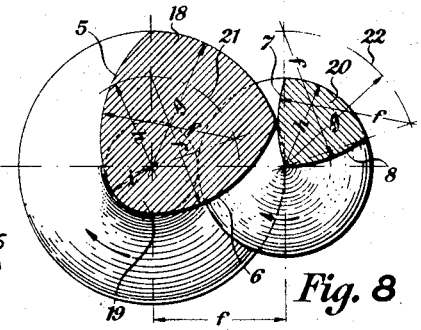
FIGURE 8 is a transverse cross-sectional view of another embodiment of a worm for use in the reactor of the present invention.

As can be seen from FIGURE 8, the cooperating worms need not be of the same size and shape. In this example of the possible combinations, a worm 18 with a core 19 is combined with a coreless worm 20 which, moreover, has a smaller diameter than the worm 18. This difference in the shapes of the two worms 18 and 20 also determines their distance apart, the peripheral line of the worm 18 passing through the axis of the worm 20 whereas, on the other hand, the peripheral line of the worm 20 is tangential to the peripheral line of the core 19 of the worm 18. Thus, the distance $f$ between the axes of the two worms 18 and 20 corresponds to the sum of the radius $h$ of the outer surface of the worm 20 and the core radius $i$ of the worm 18. The shaping of the two worms 18 and 20, as seen in cross-section, is again determined (so far as the flanks 5 and 6 or 7 and 8 are concerned) according to the teaching of this invention, that is, the arcuate surfaces of the flanks 5 and 6 of the worm 18 and the arcuate surfaces of the flanks 7 and 8 of the worm 20 each have the radius $f$ corresponding to the distance between the axes of the worms. The compliance with the requirements is particularly clearly evident here. The centers about which the arcs of the flank surfaces 5 or 6 are struck are the points at which an auxiliary circle 21 having the radius $h$ of the outer surface of the worm 20 and its center on the axis of the worm 18 is intersected by the lines joining the axis of the worm 18 to the respective points at which the arc of the outer surface of the worm 18 meets the arcs of the flanks 5 or 6.

On the other hand, the centers about which the arcs of the flank surfaces 7 or 8 of the worm 20 are struck are the points at which an auxiliary circle 22 having the radius $g$ of the outer surface of the worm 18 and its center on the axis of the worm 20 is intersected by extensions of the lines joining the axis of the worm 20 to the respective points at which the arc of the outer surface of the worm 20 meets the arcs of the flanks 7 or 8.

Figure 9:
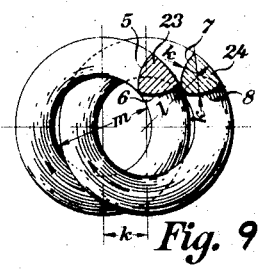
FIGURE 9 is a transverse cross-sectional view of still another embodiment of a worm for use in the reactor of the present invention.

The worms 23 and 24 shown in cross-section in FIGURE 9 have the same diameter and a "negative" core radius, that is, the diameter of the outer surface of the one worm extends beyond the axis of the other worm or, in other words, the radius $l$ of the worms is longer than the distance $k$ between the axes of the worms. In this construction, the worms 23 and 24 have the shape of spirally wound worm lands wrapped around a cylindrical space of diameter $m$. For the cross-sectional shape of the worms 23 and 24 there again applies the geometrical relationship that the radius $k$ of the arcuate flank surfaces 5 and 6 or 7 and 8 corresponds to the distance $k$ between the axes of the two worms.

In the constructional examples of the worms according to the invention thus far described with reference to FIGURES 5 to 9, the pitch and cross-sectional shape have been so chosen that these worms interengage uninterruptedly, as is shown for example in FIGURE 5.

In FIGURES 10 and 11, there is illustrated how the basic principle of the worms according to the invention may be incorporated in worms which interengage with axial play. Such worms may find application in a reactor such as has been described with reference to FIGURES 1 to 4. However, these worms interengaging with axial play may also be modified and combined in the manners described with reference to FIGURES 5 to 9. These measures operate upon the cross-sectional form of the worms 25 and 26 of FIGURES 10 and 11 in such a manner that the arc of radius $o$ of the outer surface 3 or 4 is shortened by an angular amount so that the arcuate flank surfaces 5 and 6 or 7 and 8 are brought closer together. The radius $n$ of the flanks 5 and 6 or 7 and 8 again corresponds to the distance $n$ between the axes of the two worms which in this case is determined by the sum of the radius $o$ of the worms and the radius $p$ of the worm cores 9 or 10. It will be understood that in this example of the invention also one or both of the worms may be coreless.

With these worms, as has been described in relation to the reactor, a mutual cleaning or stripping of the flanks occurs only at certain intervals of time and then only on one flank at a time. It is, therefore, necessary to provide for an additional movement of the worms, for example, the axial displacement referred to above, in order to effect cleaning of both flanks. However, instead of this axial displacement, it may also be arranged that one of the worms, after a certain angular rotation, is temporarily arrested while the other worm continues to rotate.

In FIGURE 10, the two worms 25 and 26 are shown in such a position of relative adjustment that the land edge 12 is sliding along the opposed flank 7 of the adjacent worm. Should it be desired that the second flank 8 of the worm 26 must now also be cleaned by means of the other worm 25, the left-hand worm 26 must be arrested for a short space of time after having executed a certain angular motion. FIGURE 11 shows the two worms 25 and 26 in such a position that, when compared with the position shown in FIGURE 10, the worm 26 will be seen to have rotated further through an angle of 180° whereas the worm 25 has first rotated through an angle of 60° and then been held stationary (the worm 26 alone moving while it is transversing the final 120° of the 180° path).

Due to this differential rotation of the worms 25 and 26, the land edge 11 of the worm 25 has come into contact with the flank 8 of the worm 26.

The rhythm of the movements and dwells of the two worms 25 and 26 is suitably so adjusted that from the position shown in FIGURE 10, both worms first complete a full revolution. Then the left-hand worm 25 remains stationary while the right-hand worm 26 continues to advance through an angle of 120°. Thereupon both worms execute a complete revolution and then the right-hand worm 26 is held stationary while the left-hand worm 25 continues to advance through an angle of 120°. There is a continuous alternation, therefore, of a complete revolution of both worms together with a partial revolution of the one worm while the other is stationary. In this way, both worms are cleaned.

When worms of the type last described are employed in a reactor according to FIGURES 1 to 4, it is necessary, naturally, to provide a correspondingly constructed gearing to ensure the intermittent drive of the worms.

By the present invention, there has been provided a condensation reactor for carrying out a continuous polycondensation process. The starting material, for example, diglycol terephthalate, is continuously supplied into one end of the container, is advanced through the reaction space in the container by the rotating worms at a rate determined by the selected speed of rotation of the rotating worms, and is continuously removed at the other end as the reaction product, for example, as polyethylene terephthalate. The reaction space is filled with liquid to a predetermined level such that the rotating worms always project out of the reaction liquid to a substantial extent. Due to the rotation of the worms, the condensation process is expedited in that the liquid continually carried out of the body of liquid by the flanks of the rotating worms forms a liquid film on these flanks which condenses rapidly.

In the region of the mutual contacting of the flanks, the worm threads or lands bear tightly upon each other so that the formation of a liquid film in this region is not possible. Were the worms to interengage uninterruptedly, the inner worms, which are in engagement at both sides with neighboring worms, could not cause the formation of the liquid film which is desirable for the progress of the reaction. In order to avoid this difficulty, the individual worms are arranged, according to a feature of the invention, to interengage with axial play. Thus, at least one part of the worms, preferably the middle worm when there are three worms, is made axially displaceable so that alternately the one or the other flank of the worm land can be brought into contact with the outer peripheral edge of the neighboring worm and thus be cleaned. In this way the mutual cleaning of the worms is retained and the formation of a liquid film is facilitated.

The wall of the reaction container fits closely to the outer edges of the worms, at least in the region of the body of liquid. In this way, closed chambers are formed from turn to turn of the lands (as seen in the axial direction), which chambers extend over the whole width of the reaction container. By reason of the rotation of the worms in common, these individual chambers are progressively moved from the inlet end of the container to the outlet end without mixing of the reaction material in the axial direction occurring. The requirement for the maintenance of such separated individual chambers is the maintaining of a certain degree of filling of the reaction container; the level of the liquid must not be above the edge of the worm and the wall of the container must fit tightly to the outer peripheral edges of the worms, at least up to the level of the surface of the liquid.

The drive for the worms may be derived from a motor which actuates one of the worms from which the drive is transmitted to the other worms through suitable gearing in such manner that all the worms wills be rotated in the same direction. The gearing is disposed externally of the reaction container and outside the heating container. The intermittent axial displacements of one or more of the worms, in accordance with a feature of the invention, is effected by means of a piston moved pneumatically or hydraulically in a cylinder. This cylinder-piston unit is also disposed externally of the reactor.

While we have described a preferred embodiment of the invention, it will be understood that the invention is not limited thereto, since it may be otherwise embodied within the scope of the following claims.

We claim:

1. Polymerization apparatus for the manufacture of linear polymers comprising a container for reacting liquid, means for supplying reacting liquid to said container to a predetermined level, at least two elongated worms rotatably mounted in said container, the axes of the worms being parallel, the worms being single threaded, having the same pitch throughout their length and having the same hand and the same direction of rotation, said container including a wall fitting closely to the lower edges of the lands of the worms and up to the height of said predetermined level of liquid and said wall being spaced from the upper edges of the lands of the worms to define a reaction space above the worms substantially coextensive with the worms, the top of the lands of the worms being above said predetermined liquid level and said worms cooperating with one another and with said wall of said container so as to define spaced, separate chambers between adjacent flanks for holding reacting liquid and for advancing reacting liquid through the container upon rotation of said worms, a liquid film being formed on the worms during rotation thereof, the flanks of the lands of the worms being arcuately formed in cross-section to a curvature having a radius corresponding to the distance between the axes of the worms and defining land edges at the joinder of the flanks with the outer surfaces of the worms, the worms interengaging one another in edge to flank relationship along at least parts of their length so as to exert a sliding and mutual cleaning action upon at least parts of each other during their rotation for cleaning liquid from the worms, means for creating a vacuum in the container above the liquid, means for removing reaction product from the container, and means for heating the contents of the container.

2. Polymerization apparatus according to claim 1 wherein the adjacent worms interengage uninteruuptedly along their length such that each of the worms effects a complete cleaning of the adjacent worm.

3. Polymerization apparatus as in claim 1 wherein the central points of the axes of the flanks lie at the contacting points where the flanks meet the outer surfaces of the worms.

4. Polymerization apparatus as in claim 1 wherein each of said elongated worms has an outer surface which in radial cross section has the form of a circular arc centered upon the longitudinal axis of the worm and has a radius of curvature equal to the radius of the worm, so that the outer surface intersects the two flanks of that worm in two spiral contacting edges.

5. Polymerization apparatus as in claim 1 wherein each of the worms has the same radius and wherein in radial cross section the center of curvature of each flank of each worm is that point at which the other flank of that worm intersects the outer surface of that worm.

6. Polymerization apparatus according to claim 1, wherein the reaction product is extracted at the end of the reaction container by means of a conveyor worm and fed to means for working up the same.

7. Polymerization apparatus as in claim 1, wherein said worms are of different diameters, and the sum of the radii of adjacent worms is equal to the distance between the axes of said adjacent worms.

8. Apparatus according to claim 1, wherein the worms are constructed as vanes with an endless pitch.

9. Polymerization apparatus according to claim 1, wherein the worms interengage one another and are constructed to define a gap in the axial direction between succeeding lands.

10. Polymerization apparatus according to claim 9, wherein, means are provided for temporarily arresting the rotation of one worm while the other worm continues to rotate.

11. Polymerization apparatus according to claim 1 wherein the means for heating the container includes a heating jacket disposed about the container.

12. Polymerization apparatus according to claim 11, wherein three adjacently arranged worms are disposed in the container and the central worm is mounted for axial displacement, and means disposed externally of said container for displacing the central worm.

13. Apparatus according to claim 11, wherein the heating jacket is subdivided along its length into several separate heating chambers.

14. Polymerization apparatus according to claim 11, wherein gearing for causing rotation of the worms all in the same direction is disposed externally of the heating jacket and is insulated against heat by a cooling wall.

References Cited

UNITED STATES PATENTS

| 1,468,379 | 9/1923 | Easton | 202—217 X |
| 2,048,286 | 7/1936 | Pease. | |
| 2,435,228 | 2/1948 | Mann | 23—285 |
| 2,672,404 | 3/1954 | Schultz | 23—285 X |
| 2,761,657 | 9/1956 | Rietz | 259—104 X |
| 2,883,162 | 4/1959 | Rapson | 259—6 X |
| 2,970,038 | 1/1961 | Hyde | 23—285 X |
| 3,104,420 | 9/1963 | Selbach | 25—14 X |
| 3,195,868 | 7/1965 | Loomans et al. | 259—104 |

MORRIS O. WOLK, *Primary Examiner.*

J. SCOVRONEK, *Assistant Examiner.*